(12) United States Patent
Bellali et al.

(10) Patent No.: US 11,363,855 B2
(45) Date of Patent: Jun. 21, 2022

(54) FOOTWEAR ARTICLES AND METHODS FOR PREPARING A FOOTWEAR ARTICLE

(71) Applicant: VANS, INC., Costa Mesa, CA (US)

(72) Inventors: Safir Bellali, Pasadena, CA (US); Longtao Wang, Alhambra, CA (US); Henry Song, Glendale, CA (US)

(73) Assignee: Vans, Inc., Costa Mesa, CA (US)

( * ) Notice: Subject to any disclaimer, the term of this patent is extended or adjusted under 35 U.S.C. 154(b) by 0 days.

(21) Appl. No.: 17/121,447

(22) Filed: Dec. 14, 2020

(65) Prior Publication Data
US 2021/0177104 A1 Jun. 17, 2021

Related U.S. Application Data

(60) Provisional application No. 62/948,508, filed on Dec. 16, 2019.

(51) Int. Cl.
| | |
|---|---|
| *B29D 35/14* | (2010.01) |
| *B29D 35/06* | (2010.01) |
| *B29D 35/08* | (2010.01) |
| *B29K 105/04* | (2006.01) |
| *A43D 86/00* | (2006.01) |
| *A43B 13/12* | (2006.01) |
| *A43B 1/00* | (2006.01) |
| *B33Y 80/00* | (2015.01) |
| *B29K 75/00* | (2006.01) |

(52) U.S. Cl.
CPC .......... *A43D 86/00* (2013.01); *A43B 1/0009* (2013.01); *A43B 13/125* (2013.01); *B29D 35/061* (2013.01); *B29D 35/081* (2013.01); *B29D 35/142* (2013.01); *B29K 2075/00* (2013.01); *B29K 2105/04* (2013.01); *B33Y 80/00* (2014.12)

(58) Field of Classification Search
CPC .......................... A43B 1/0009; B29D 35/061
See application file for complete search history.

(56) References Cited

U.S. PATENT DOCUMENTS

| | | | | |
|---|---|---|---|---|
| 5,193,240 A | * | 3/1993 | Salpietro | A43B 1/0072 12/142 RS |
| 2015/0165690 A1 | | 6/2015 | Tow | |
| 2018/0271213 A1 | * | 9/2018 | Perrault | A43B 13/181 |
| 2019/0365027 A1 | * | 12/2019 | Chamblin | A43B 13/122 |

FOREIGN PATENT DOCUMENTS

| | | | |
|---|---|---|---|
| EP | 2874809 A2 | 5/2015 | |
| EP | 3056103 A1 | 8/2016 | |
| EP | 3061363 A1 | 8/2016 | |
| EP | 3563710 A1 | 11/2019 | |
| KR | 20180080448 A | 7/2018 | |
| WO | WO-2021089767 A1 * | 5/2021 | ............... A43D 1/02 |

OTHER PUBLICATIONS

International Search Report and Written Opinion dated Mar. 24, 2021 for PCT Application No. PCT/US2020/064902; 14 pages.

* cited by examiner

*Primary Examiner* — Niki Bakhtiari
*Assistant Examiner* — John J DeRusso
(74) *Attorney, Agent, or Firm* — Smith, Gambrell & Russell LLP (57) ABSTRACT

Methods for preparing a footwear article are disclosed herein. An example method may comprise disposing resin adjacent a mold, disposing a lattice structure in at least a portion of the resin disposed adjacent the mold, closing the mold using a lasted upper, injecting foam into the closed mold such that the foam operates to couple the lasted upper and the lattice structure together.

15 Claims, 9 Drawing Sheets

FOOTWEAR ARTICLES AND METHODS FOR PREPARING A FOOTWEAR ARTICLE

CROSS REFERENCE TO RELATED APPLICATIONS

This application is a non-provisional of and claims the benefit of U.S. Provisional Application No. 62/948,508 filed Dec. 16, 2019, which is hereby incorporated by reference in its entirety.

BACKGROUND

Footwear components can be joined by any number of well-known methods, including, but not limited to, stitching by hand or machine, adhesives, vulcanization, and injection molding. The method of joining can affect many aspects of the footwear, including durability and cost of manufacture.

However, improvements are needed.

SUMMARY

Systems and/or methods for preparing a footwear article are disclosed herein. An example method may comprise disposing a material (e.g., uncured resin, cured resin, vulcanized rubber, etc.) adjacent a mold, disposing a lattice structure in at least a portion of the material (e.g., uncured resin, cured resin, rubber outsole, etc.) disposed adjacent the mold, closing the mold using a lasted upper, injecting foam into the closed mold such that the foam operates to couple the lasted upper and the lattice structure together. Other processes and systems may be used, for example, including the absence of an outsole altogether. Steps need not be performed.

Additive manufacturing methods like 3D printing have allowed footwear manufacturers to create footwear components, like foot beds and even midsoles that are customized to a person's anatomy and activity. The challenge is that these custom components, if not removable, still have to be glued to the footwear upper and easily collect debris and small objects in the open lattice structure, and offer limited durability and abrasion resistance. The present disclosure may address one or more challenges in the prior art by enclosing a component (e.g., customized component) in foam and using the injected foam as a bonding agent between the upper and the outsole. As a further example, this may allow automation of one or more parts of a manufacturing process while offering customized fit.

Systems and/or methods for preparing a footwear article are disclosed herein. An example method may comprise disposing an first resin (e.g., a cured or uncured resin) or vulcanized rubber in a female mold associated with footwear. Such a first resin or rubber may comprise a portion of an outsole of a footwear article. However, the example method may not comprise using an outsole. The example method may comprise closing the mold. If the first resin is uncured, the example method may comprise curing the first resin to provide a cured first resin in the mold. The example method may comprise disposing a second resin (e.g., a cured or uncured resin) on at least a portion of the cured first resin in the mold. The example method may comprise disposing a lattice structure in at least a portion of the second resin disposed on the cured first resin in the mold. The example method may comprise closing the mold using a lasted upper. The example method may comprise injecting foam into the closed mold such that the foam operates to couple the lasted upper and the lattice structure together. The example method may comprise releasing the closed mold.

Systems and/or methods for preparing a footwear article are disclosed herein. An example method may comprise disposing an uncured first resin in a mold. Reference is made to an uncured resin, but use of a cured resin, vulcanized rubber or other materials may be used. Moreover, the inclusion of the first resin or rubber component is not required. The example method may comprise curing the first resin (if uncured) to provide a cured first resin. The example method may comprise disposing a second resin (e.g., a cured or uncured resin) on at least a portion of the cured first resin in the mold. The example method may comprise disposing a lattice structure in at least a portion of the second resin disposed on the cured first resin in the mold. The example method may comprise closing the mold using a lasted upper. The example method may comprise injecting foam into the closed mold such that the foam operates to couple the lasted upper and the lattice structure together.

BRIEF DESCRIPTION OF THE DRAWINGS

The following drawings show generally, by way of example, but not by way of limitation, various examples discussed in the present disclosure. In the drawings.

DETAILED DESCRIPTION

Up until now, additive manufacturing methods like 3D printing have allowed footwear manufacturers to create footwear components, such as footbeds and midsoles, which are customized to a person's anatomy and activity. The challenge is that these custom components, if not removable, still have to be glued to the footwear upper and easily collect debris and small objects in the open lattice structure, and offer limited durability and abrasion resistance. The articles and methods of the present disclosure may address one, or both of these challenges at the same time, by enclosing a customized component in a foam and using an injected foam as a bonding agent between an upper and an outsole.

Systems and/or methods for preparing a footwear article are disclosed herein. An example method may comprise disposing an first resin (e.g., a cured or uncured resin) in a female mold associated with footwear. The first resin may comprise a clear resin. The example method may comprise closing the mold. The example method may also comprise curing the first resin (if uncured) to provide a cured first resin in the mold. A first cured resin may form at least a portion of an outsole of a footwear article. Other materials, such as rubber or vulcanized rubber, may be used in lieu of the resin. Moreover, footwear articles may be formed without including a resin or rubber material as an outsole component. The example method may comprise disposing a second resin (e.g., a cured or uncured resin) on at least a portion of the cured first resin in the mold. The second resin may comprise a clear resin.

The example method may comprise disposing a lattice structure in at least a portion of the second resin disposed on the cured first resin in the mold. The lattice structure may be formed using additive manufacturing. In certain aspects, the second resin may be disposed in or adjacent the mold with or without the first resin. As such, the term "second resin" as used herein is illustrative in certain examples and is not intended to require multiple resin layers.

The example method may comprise closing the mold using a lasted upper. The closing the mold using a lasted upper may comprise using a mold component comprising an integral upper. The upper may comprise a knit upper.

The example method may comprise injecting foam into the closed mold such that the foam operates to couple the lasted upper and the lattice structure together. The foam may operate as a base cushion layer in a footwear article. The example method may comprise releasing the closed mold.

A footwear article may be formed using the example method.

Systems and/or methods for preparing a footwear article are disclosed herein.

Footwear articles formed using the example methods are described herein. Footwear articles formed using the example methods may comprise one or more portions (e.g., footwear subcomponents). An example footwear article may comprise an upper, a midsole, an outsole and other portions.

The upper may comprise the topmost external portion of the footwear article which conforms to the wearer's foot. The upper may comprise material such as knit material, fabric or leather suitable for forming an external portion of the footwear article.

The midsole may be disposed within the footwear article between the upper and the outsole. The midsole may comprise foam, encapsulated air, gel or plastic suitable for cushioning the wearer's foot and stabilizing the footwear article.

A footwear article may comprise one or more lattice structures in one or more of its portions. The midsole may be or comprise one or more lattice structures. The lattice structure may comprise plastic or other materials. The lattice structure may be defined by a plurality of interconnected struts. The lattice structure may comprise a substantially planar three-dimensional structure formed using additive manufacturing.

The outsole may comprise the bottom of the footwear article which makes contact with the ground. The outsole may comprise plastic or other durable materials which are suitable for forming the bottom of the footwear article.

Figure 1:
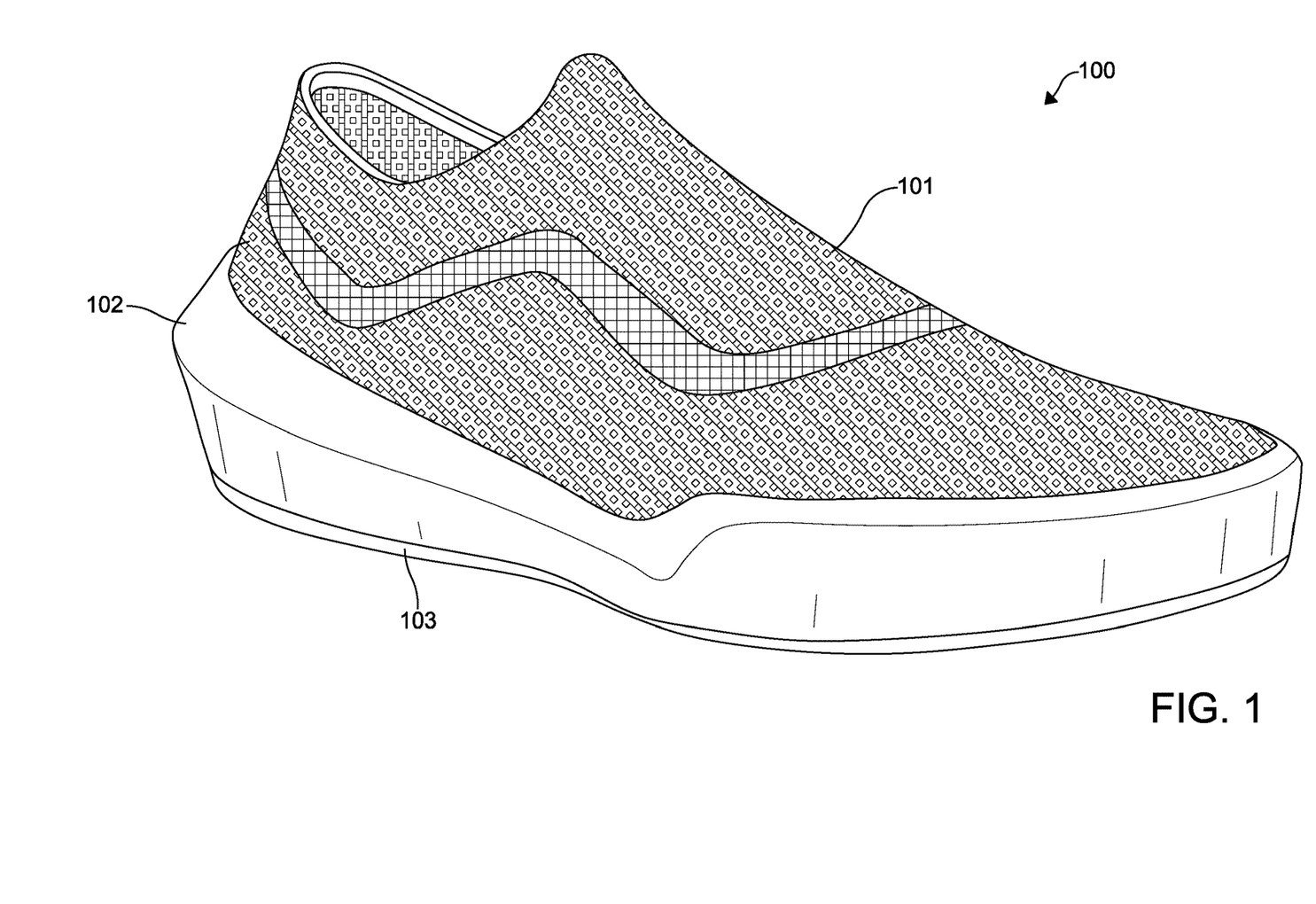
FIG. 1 shows an example footwear article in accordance with the present disclosure.

As illustrated in FIG. 1, a footwear article 100 may comprise an upper 101, a midsole 102, and an outsole 103. The upper 101 may be a knitted upper or other material or configuration. The midsole 102 may be defined by a region between the upper 101 and the outsole 103. However, other configurations may be used. The midsole 102 may be formed from a foamed material (e.g., rubber) or other materials. The midsole 102 may provide functional cushioning to the footwear article 100 to support the wearer, while providing comfort. The outsole 103 may be disposed adjacent the midsole 102. The outsole 103 may be configured to engage the ground. As an example, the outsole 103 may be disposed to protect a portion of the midsole 102. The footwear article 100 may comprise other layers such as an insole or barrier layer.

Portions of the footwear article 100 such as the midsole 102 or the outsole 103 may be formed using injection molding, resin casting, and other methods. Portions of the footwear article 100 may be formed using one or more molds. The mold may comprise two or more portions. The mold may comprise a male portion and a female portion. The male portion may be configured to be closed over the female portion. Other configurations of molds may be used. The mold may be flexible and may comprise rubber, silicone or other materials suitable for casting resins. The mold may comprise a shallow, hollow cavity. The mold may be integral, comprising portions of the footwear article such as the upper or the outsole or be integrated with a portion of the footwear article (e.g. a mold with an integral upper). The mold may comprise a lasted upper, a knit upper, or the outsole.

Figure 2A:
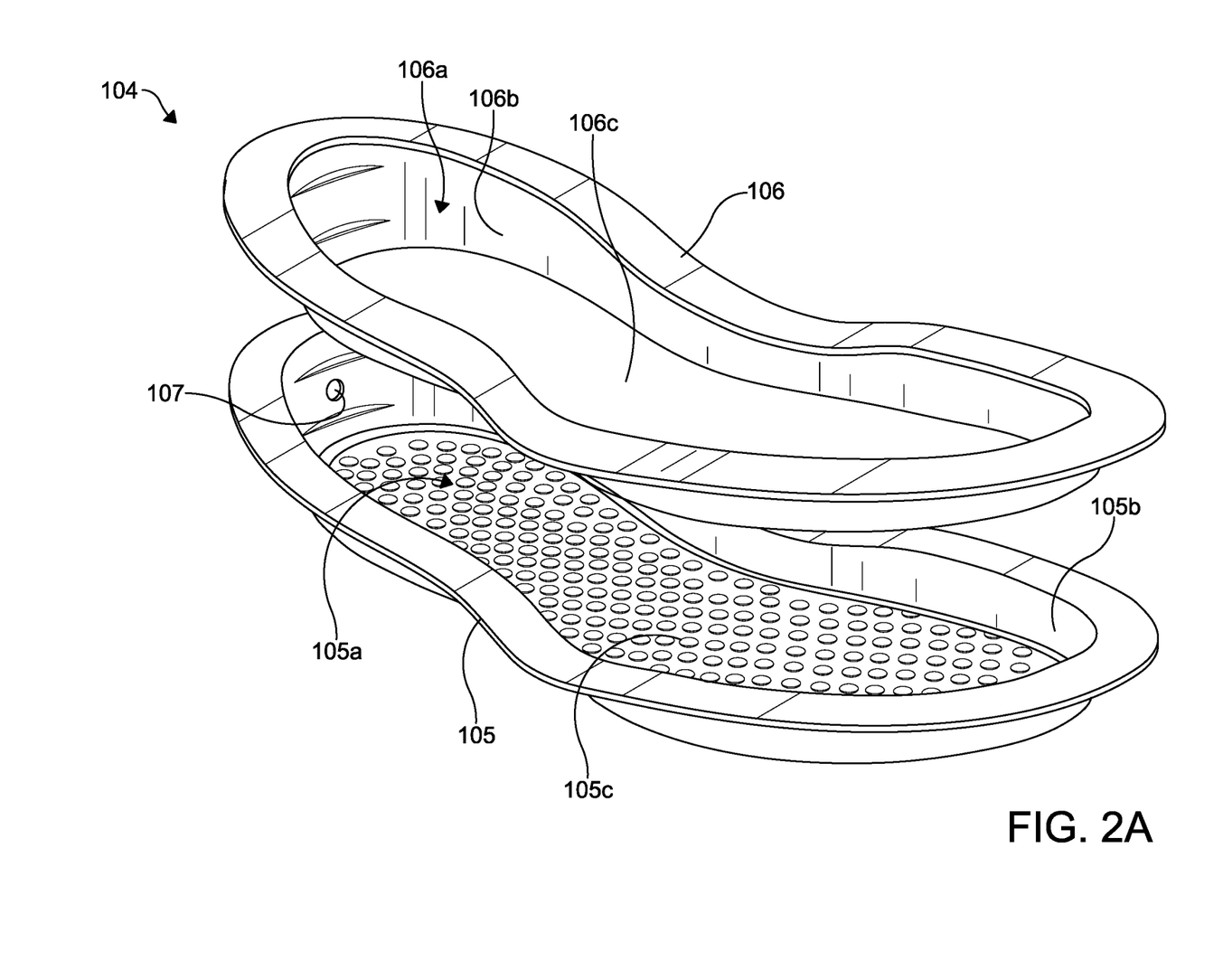
FIG. 2A illustrates an example mold in accordance with the present disclosure.
Figure 2B:
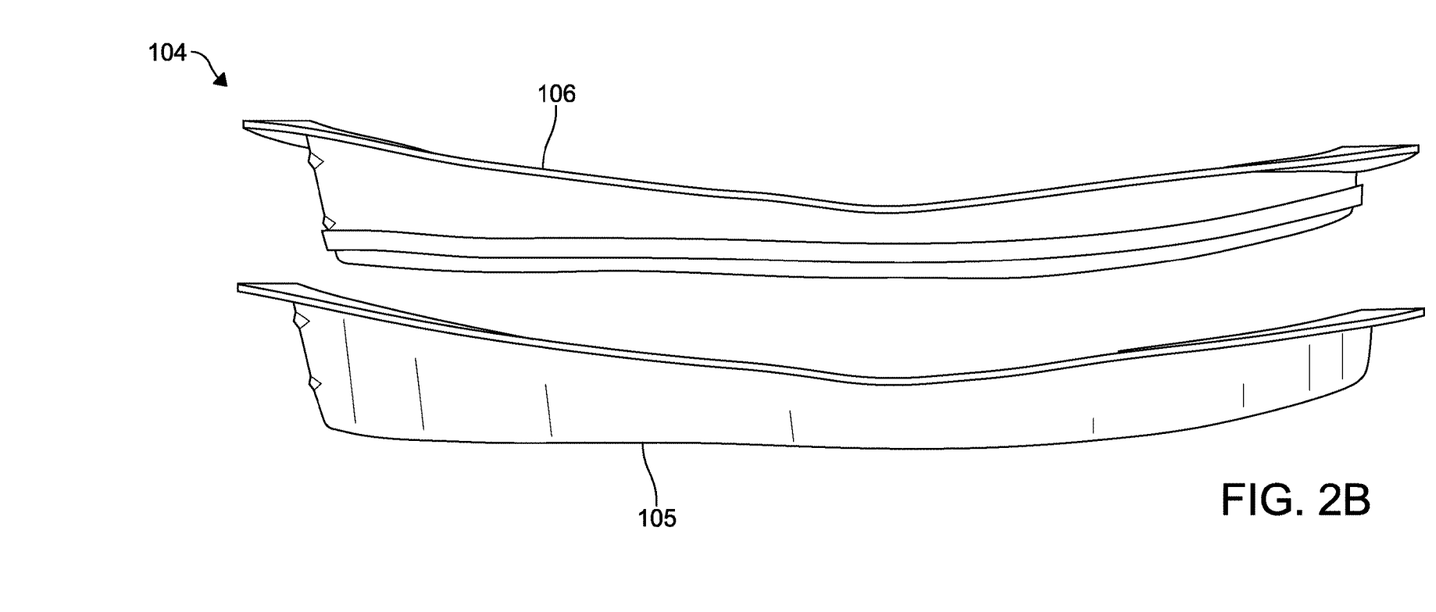
FIG. 2B shows side views of the example mold of FIG. 2A before it is closed in accordance with the present disclosure.

FIGS. 2A-2B illustrate an example mold 104 in accordance with the present disclosure. As shown, the mold 104 may comprise a female portion 105 and a male portion 106. One or more of the portions 105, 106 may have a general shape of a human foot. Other shapes may be used. The female portion 105 may be configured to serve as the bottom unit and the male portion 106 is configured to serve as the top unit configured to enclose a cavity in concert with the bottom unit. The female portion 105 may comprise a cavity 105a that may be at least partially defined by one or more walls 105b. The one or more walls 105b may be disposed at least partially circumferentially about a periphery of a bottom 105c. The bottom 105c may be generally planar, but may have other shapes and contours. The bottom 105c may comprise a texture or pattern formed therein. The female portion 105 may comprise an aperture 107 or through-hole configured to allow material to pass through the wall 105b and into the cavity 105a. The male portion 106 may comprise a cavity 106a that may be at least partially defined by one or more walls 106b. The one or more walls 106b may be disposed at least partially circumferentially about a periphery of a bottom 106c. The bottom 106c may be generally planar, but may have other shapes and contours. The bottom 105c may comprise a texture or pattern formed therein. The shape of the male portion 106 may be configured to mate with a shape of the female mold 105 (e.g., the cavity 105a) to mold a part or piece. The mold 104 or components of the mold 104 may be formed from rubber or similar materials and correspond with the shape of a footwear article. The male portion 106 may be closed over the female portion 105 of the mold 104 as part of a process to form at least portion of a footwear article, such as the footwear article 100 (FIG. 1).

Figure 2C:
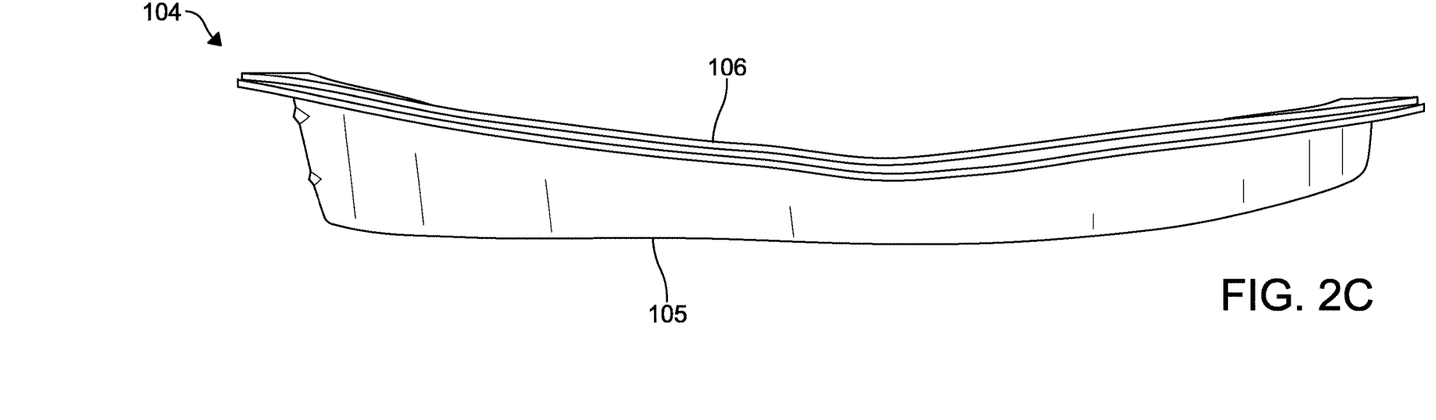
FIG. 2C shows a side view of the example mold of FIG. 2A when closed in accordance with the present disclosure.

FIG. 2B illustrates a side vie w of the female portion 105 and the male portion 106 of the mold 104 of FIG. 2A before they are closed. FIG. 2C illustrates a side view of the female and male portions 105, 106 when closed. Although an example mold is shown in the figures, other molds may be used. For example, various mold materials and shapes may be used.

One or more resins may be disposed in one or more parts of the mold to form portions of the footwear article. Resin may be a viscous substance that converts into rigid polymers through a curing process. The resins may be clear, substantially clear, opaque, substantially opaque, and generally flexible. Types of resins that may be used may include, but not be limited to clear or opaque epoxy, silicone, or polyurethane resins. Other suitable molding or casting resins are also contemplated. The resins may be organic or synthetic. The resins may comprise additives such as plasticizers, fibers, colorants and flame retardants to provide additional properties in the portions of the footwear article. Resins may be cured using any appropriate process (e.g., time, heat, radiation, electron beams, additives, etc.). First or second resins may be partially cured, such that an application of an additional resin (e.g., second resin, third resin) will chemically link with an adjacent layer of resin. Resins disposed in parts of the mold may be given time to cast and solidify as part of the preparation process. One or many different types of resins may be utilized. A first resin may be disposed in a part of the mold and cured and a second resin may be disposed on at least a portion of the first cured resin. The second resin may also be disposed elsewhere to achieve different functionalities. Additional resins may be added and cured successively to achieve different properties in the portions of the footwear article.

Figure 2D:
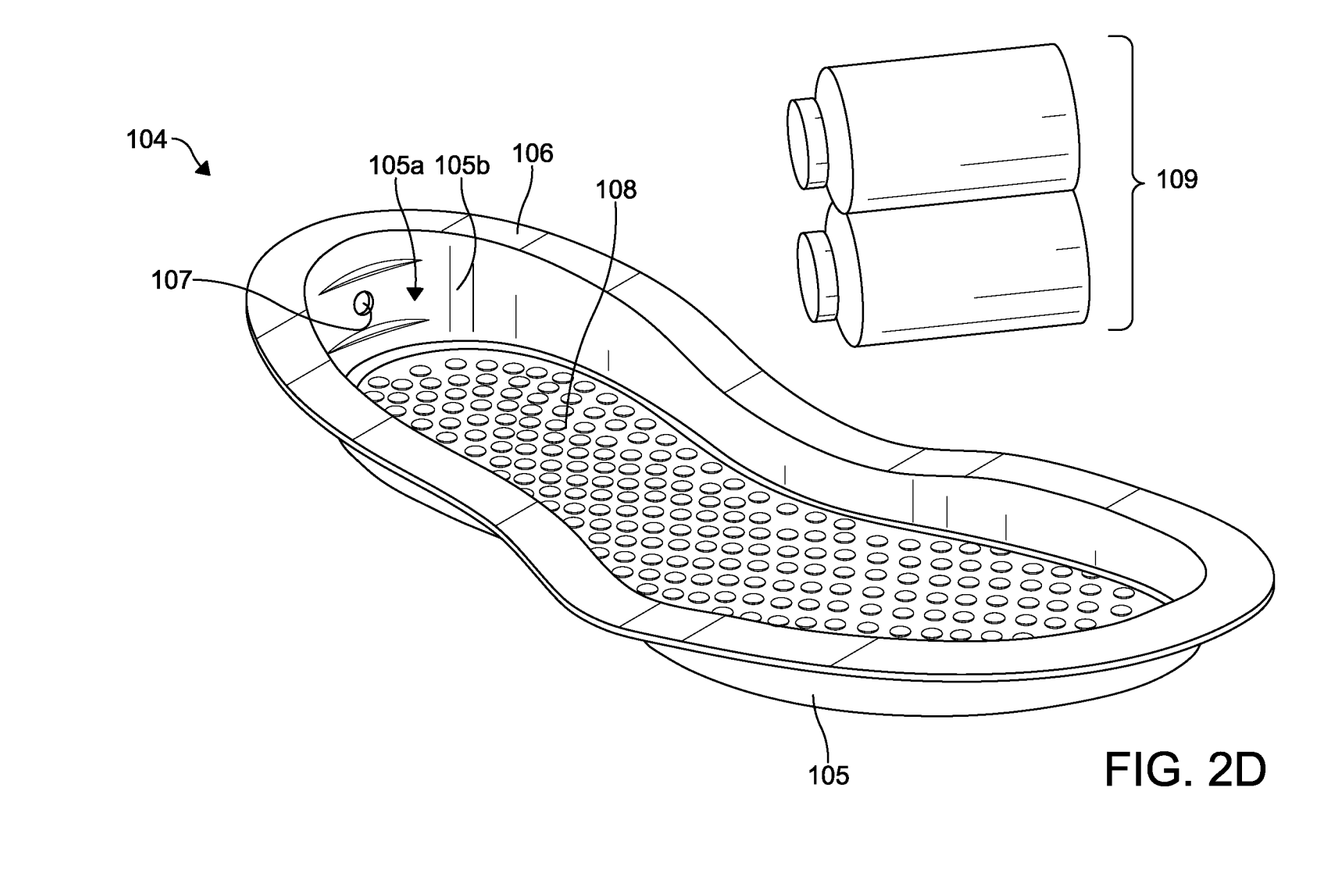
FIG. 2D shows a perspective view of the example mold of FIG. 2A when closed in accordance with the present disclosure.

Referring to FIG. 2D, a first resin 108 (e.g., a cured or uncured resin) may be disposed in the female portion 105 of the mold 104. The first resin 108 may be clear and flexible. Other resins may be used. Rubber such as vulcanized rubber may be used. In certain examples, this first resin 108 is not included. Where a first uncured resin is used, the first resin 108 may be cured to provide a cured first resin 108 in the female portion 105 of the mold 104. For example, the male portion 106 of the mold 104 may be closed upon the female portion 105 to mold the resin into a desired shape and texture. Then the mold may be released, leaving a cured, molded resin in a particular form. This form may define at least a portion of an outsole of an article of footwear (e.g., footwear article 100 (FIG. 1)). A second resin 109 (e.g., a cured or uncured resin) may be disposed on at least a portion of the cured first resin 108, for example, in the mold 104. Although the term second is used as an example, the second resin 109 may be disposed in or adjacent the mold 104 with or without other resins. As a further example, the second resin 109 may be disposed on the molded, cured first resin 108 such that the second resin provides another layer. If the second resin 109 is uncured, one or more components, such as a lattice structure (lattice structure 307 (FIGS. 3A-3B) may be disposed in the second resin 109.

Figure 3A:
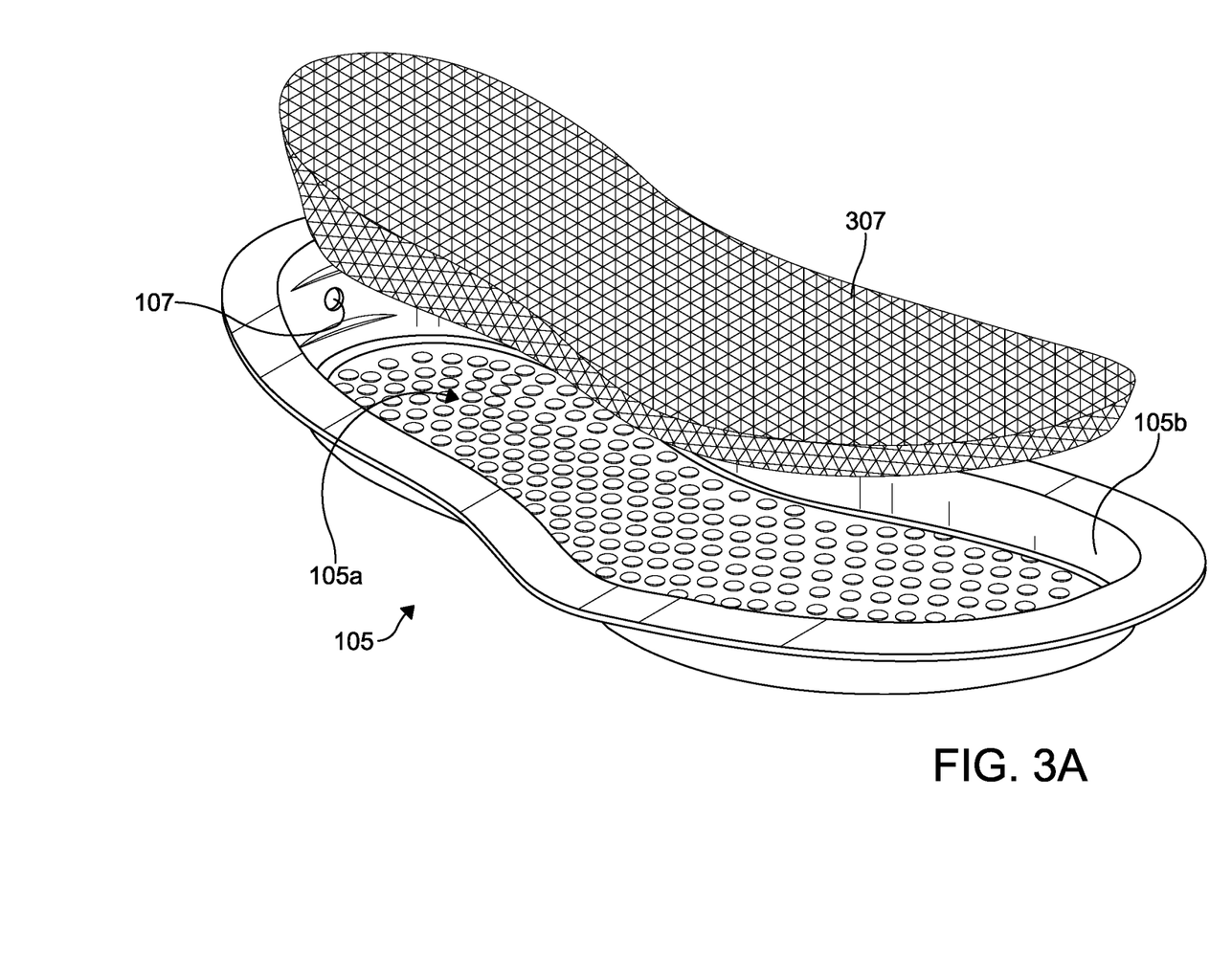
FIG. 3A shows a perspective view of an example mold and lattice in accordance with the present disclosure.
Figure 3B:
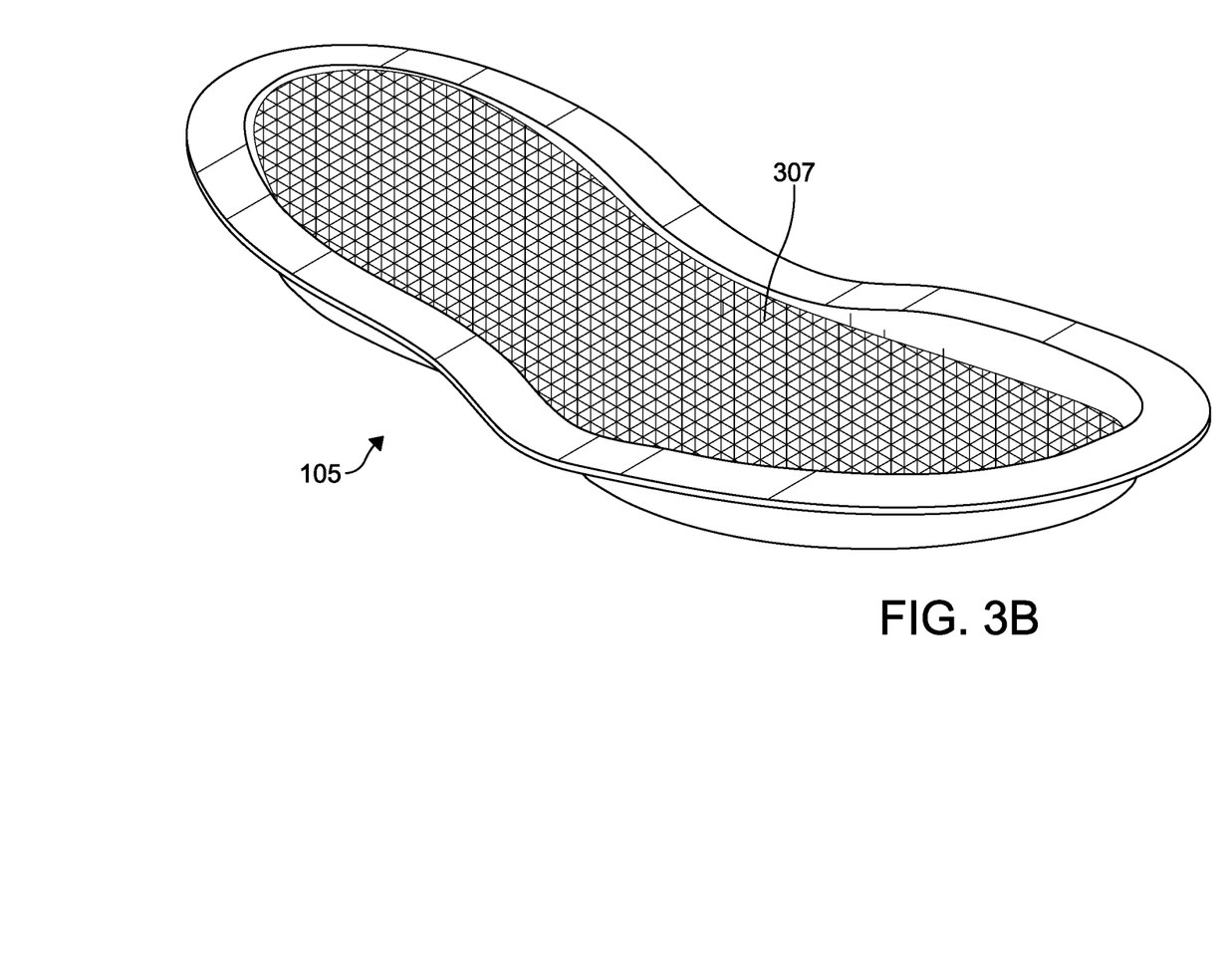
FIG. 3B shows a perspective view of the mold and lattice of FIG. 3A with the lattice disposed within the mold in accordance with the present disclosure.

FIG. 3A illustrates a lattice structure 307, which may form at least a portion of a footwear article. The lattice structure 307 may have a shape of an article of footwear. The lattice structure 307 may have a shape based on the cavity 105*a* of the female portion 105 of the mold 104. The lattice structure 307 may comprise one or more struts interconnected to define a plurality of apertures. The lattice structure 307 may have varying thickness and may be designed to provide a particular form of a portion of a footwear article. FIG. 3B illustrates the lattice structure 307 when disposed in the mold 104. The lattice structure 307 may have any shape or features and may be customized for a particular wearer or characteristic of a wearer.

Figure 4A:
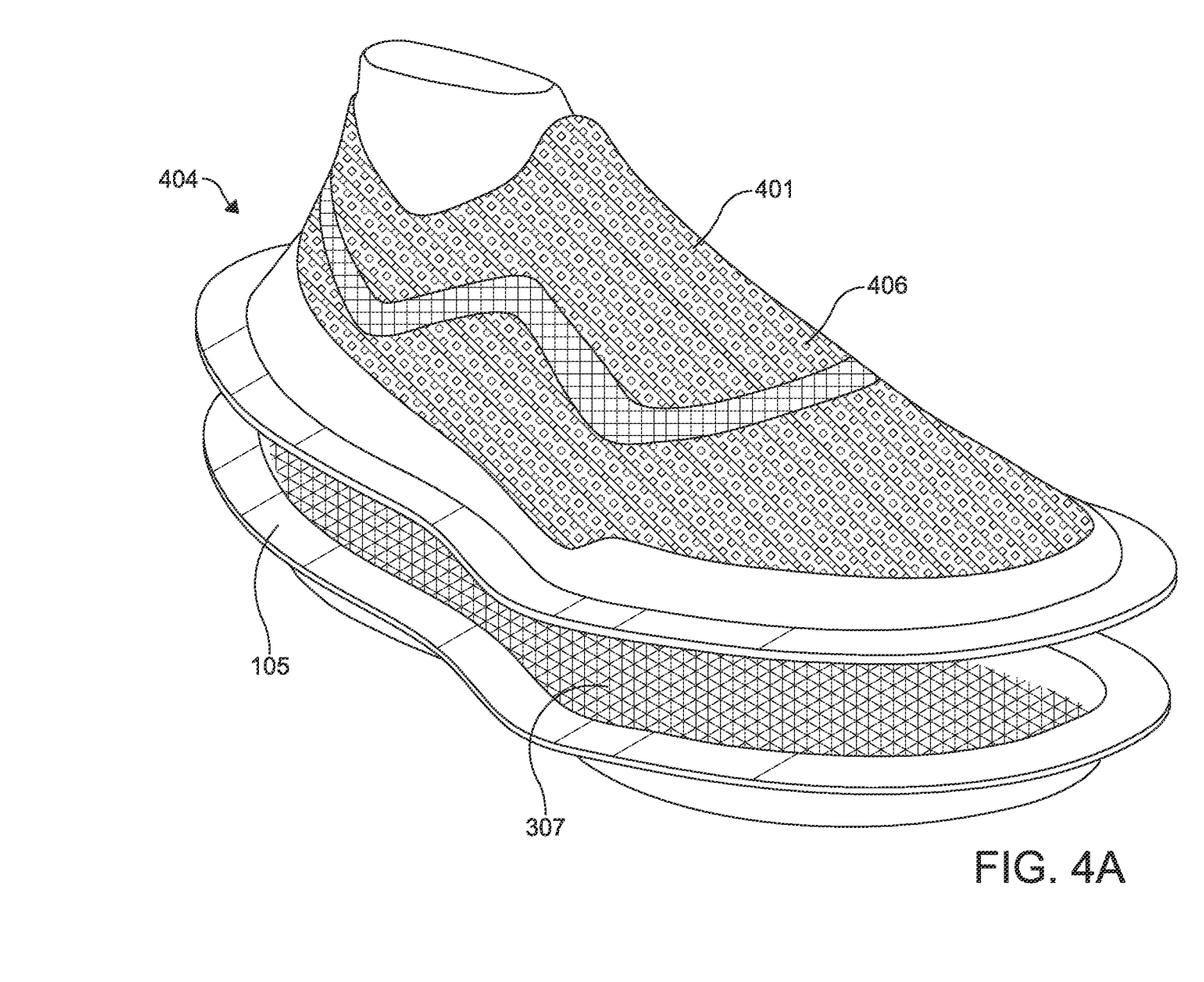
FIG. 4A shows a perspective view of an example mold in accordance with the present disclosure.
Figure 4B:
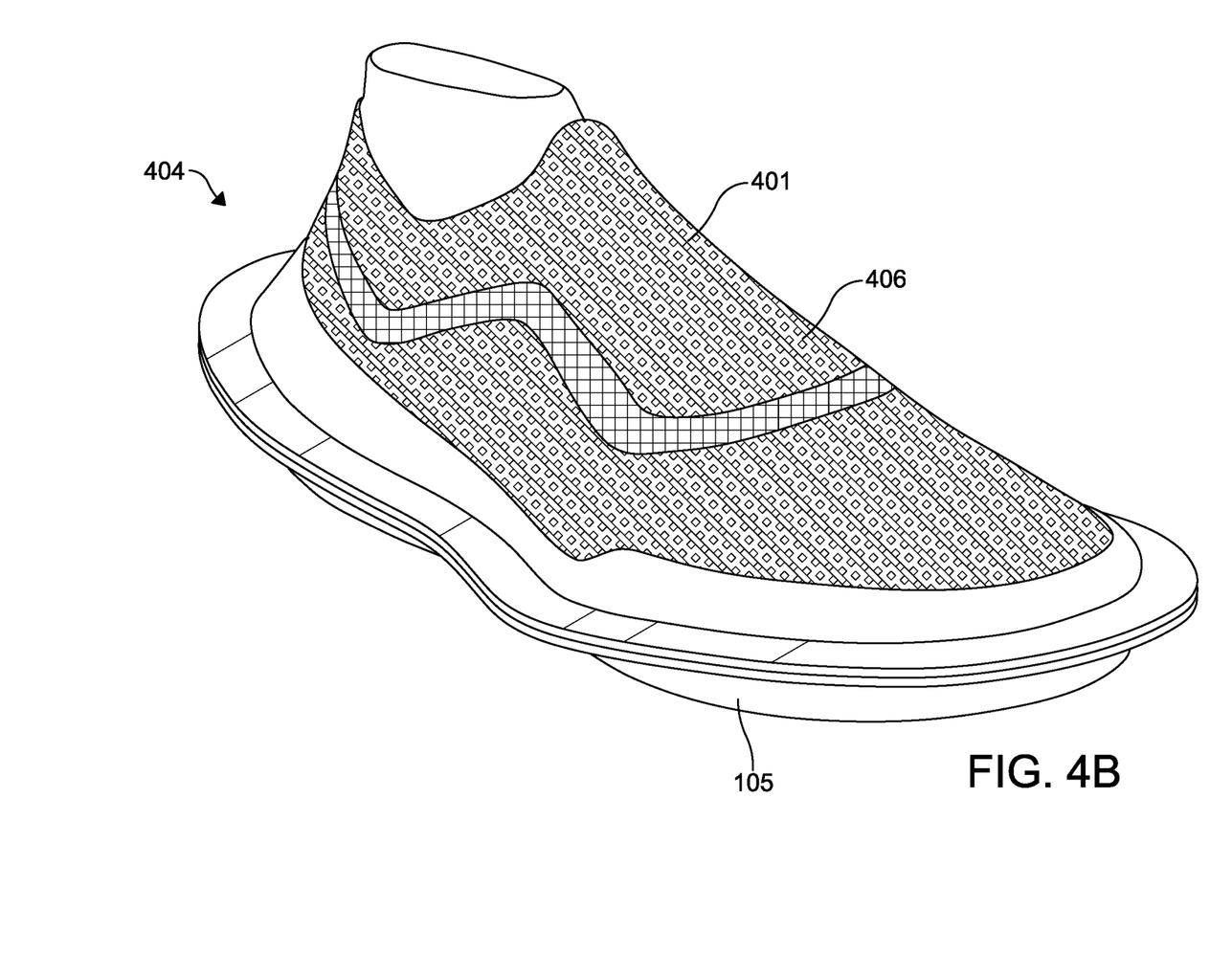
FIG. 4B shows a perspective view of the example mold of FIG. 4A when closed in accordance with the present disclosure.

As illustrated in FIG. 4A, a mold 404 may comprise one or more portions of a footwear article integrated therewith. The mold 404 may comprise a male portion 406. The male portion 406 may be configured to mate with a female portion, such as the female portion 105. As shown, the male portion 406 may comprise a lasted knitted upper 401 and the female portion 105 may comprise the first and second resins 108, 109 and the lattice structure 307. As shown in FIG. 4B, the mold 404 may be closed to couple the lattice structure 307 to the other portions of the footwear article, such as the lasted knit upper 401.

Figure 4C:
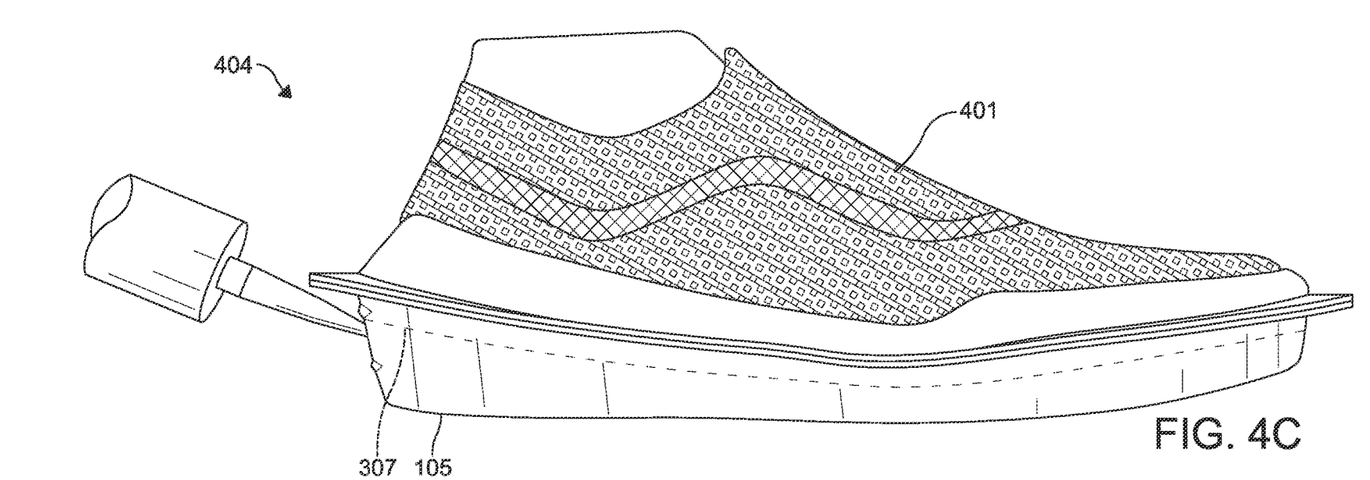
FIG. 4C shows a side view of an example footwear article formed from the example mold of FIG. 4A in accordance with the present disclosure.

As illustrated in FIG. 4C, after the mold 404 is closed, a material may be injected into at least a portion of the closed mold 404 such that the material operates to couple two or more portions of the footwear article together. The material may be foam such as foam rubber. The material may be injected via an aperture formed in the mold 404 (e.g., aperture 107 (FIG. 2A-2B). The foam may comprise polyurethane or other types of foam. The material may flow into the cavity of the mold 404 and may flow through the apertures of the lattice structure 307. The material may operate to couple the upper 401 with the lattice structure 307, and thereby couple the upper 401 to the cured resins (not shown). The mold 404 may then be released to provide a footwear article such as footwear article 100 (FIG. 1). The injected material may operate as a base cushion layer of the footwear article 100.

Figure 5:
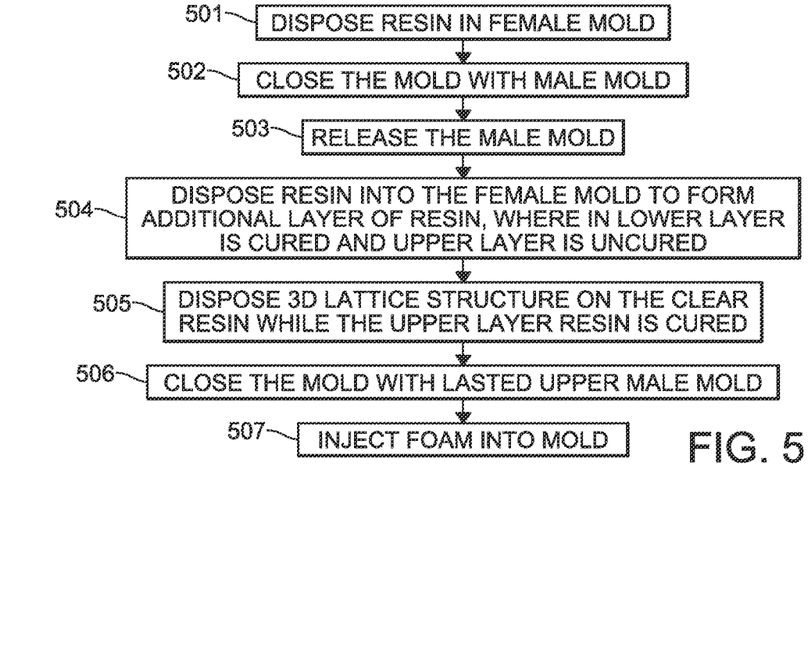
FIG. 5 is flowchart illustrating an example method of preparing a footwear article in accordance with the present disclosure.

FIG. 5 is a flowchart detailing an example method for preparing a footwear article according to the present disclosure. A mold comprising a female portion and a male portion is prepared. At step 501, a first resin is disposed into the female portion of the mold to form a first layer. Other materials such as vulcanized rubber may be used. At step 502, the mold is closed. At step 503, the male portion is released to open the mold. It should be understood that the first layer is not required. The additional steps may be implemented without inclusion of the first layer. At step 504, a second resin is disposed into the female mold to form a second layer of resin, wherein the first layer is cured and the second layer is uncured. At step 505, a 3D lattice structure is disposed on the second uncured layer of resin. At step 506, the mold is closed with a lasted upper male portion of the mold. At step 507, material (e.g., foam) is injected into the mold. Thereafter, the mold may be released to provide the footwear article.

What is claimed is:

1. A method for preparing a footwear article, the method comprising:
    disposing an uncured first resin in a mold;
    curing the first resin to provide a cured first resin;
    disposing an uncured second resin on at least a portion of the cured first resin in the mold;
    disposing a lattice structure in at least a portion of the uncured second resin disposed on the cured first resin in the mold;
    closing the mold using a lasted upper;
    injecting foam into the closed mold such that the foam operates to couple the lasted upper and the lattice structure together.

2. The method of claim 1, wherein the first resin comprises a clear resin.

3. The method of claim 1, wherein the lattice structure is formed using additive manufacturing.

4. The method of claim 1, wherein the lasted upper comprise a knit upper.

5. The method of claim 1, wherein the closing the mold using a lasted upper comprises using a mold component comprising an integral upper.

6. The method of claim 1, wherein the foam operates as a base cushion layer in a footwear article.

7. A method for preparing a footwear article, the method comprising:
- disposing a first resin in a female mold portion of a mold associated with footwear;
- closing the mold using a male mold portion;
- disposing an uncured second resin on at least a portion of the first resin in the female mold portion;
- disposing a lattice structure in at least a portion of the uncured second resin disposed on the first resin in the female mold portion;
- reclosing the mold;
- injecting foam into the mold such that the foam operates to couple the male mold portion and the lattice structure together; and
- releasing the mold.

8. The method of claim 7, wherein one or more of the first resin or the second resin comprises a clear resin.

9. The method of claim 7, wherein the foam operates as a base cushion layer in a footwear article.

10. The method of claim 7, wherein the first resin is uncured.

11. The method of claim 10, further comprising curing the first resin to provide a cured first resin in the female mold portion.

12. The method of claim 7, wherein the male mold portion comprises a lasted upper.

13. The method of claim 12, wherein the lasted upper is an integral upper.

14. The method of claim 7, wherein releasing the mold comprises forming at least a portion of a footwear article.

15. The method of claim 7, wherein the lattice structure comprises one or more struts interconnected to define a plurality of apertures.

* * * * *